Sept. 1, 1925.

P. G. ZIMMERMANN

LANDING GEAR

Filed Aug. 23, 1921

INVENTOR
Paul G. Zimmermann
BY
ATTORNEY

Sept. 1, 1925.

P. G. ZIMMERMANN

LANDING GEAR

Filed Aug. 23, 1921

INVENTOR
Paul G. Zimmermann
BY
ATTORNEY

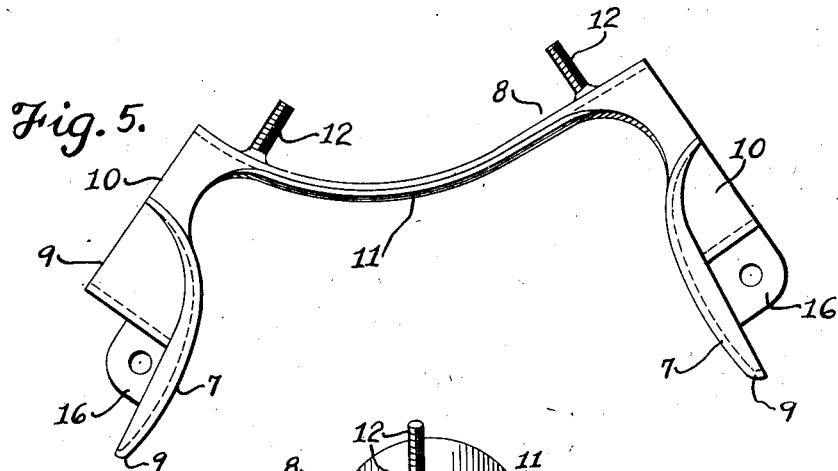
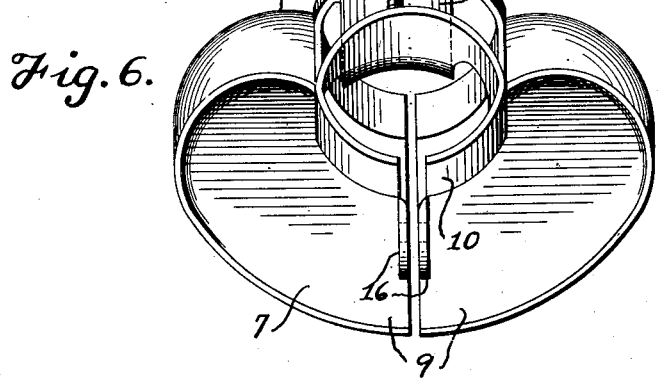
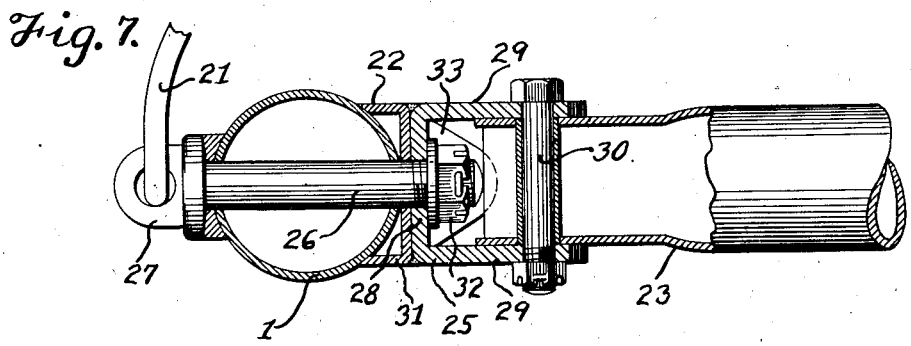

Patented Sept. 1, 1925.

1,552,258

UNITED STATES PATENT OFFICE.

PAUL G. ZIMMERMANN, OF KEYPORT, NEW JERSEY, ASSIGNOR TO AEROMARINE PLANE & MOTOR COMPANY, OF NEW YORK, N. Y., A CORPORATION OF NEW YORK.

LANDING GEAR.

Application filed August 23, 1921. Serial No. 494,422.

*To all whom it may concern:*

Be it known that I, PAUL G. ZIMMERMANN, a citizen of the United States, and resident of Keyport, in the county of Monmouth and State of New Jersey, have invented certain new and useful Improvements in Landing Gears, of which the following is a specification.

The invention comprises improvements in landing gears for aeroplanes having for their objects, among others, simplification and cheapening of the construction, greater strength and durability, and increased capacity for the discharge of the landing gear functions. These ends are attained by certain novel features of construction and relationship and combinations of parts which will now be briefly explained by reference to the preferred embodiment, and hereinafter more particularly pointed out in the claims.

In the accompanying drawings forming a part hereof;

Fig. 5 is an enlarged side elevation of the bent-on rubber guard;

Fig. 6 is an end view thereof; and

Fig. 7 is an enlarged detail section taken longitudinally of the end portion of one of the spacers and transversely to the main strut member, with parts in the plane of section shown in elevation.

Figure 1:
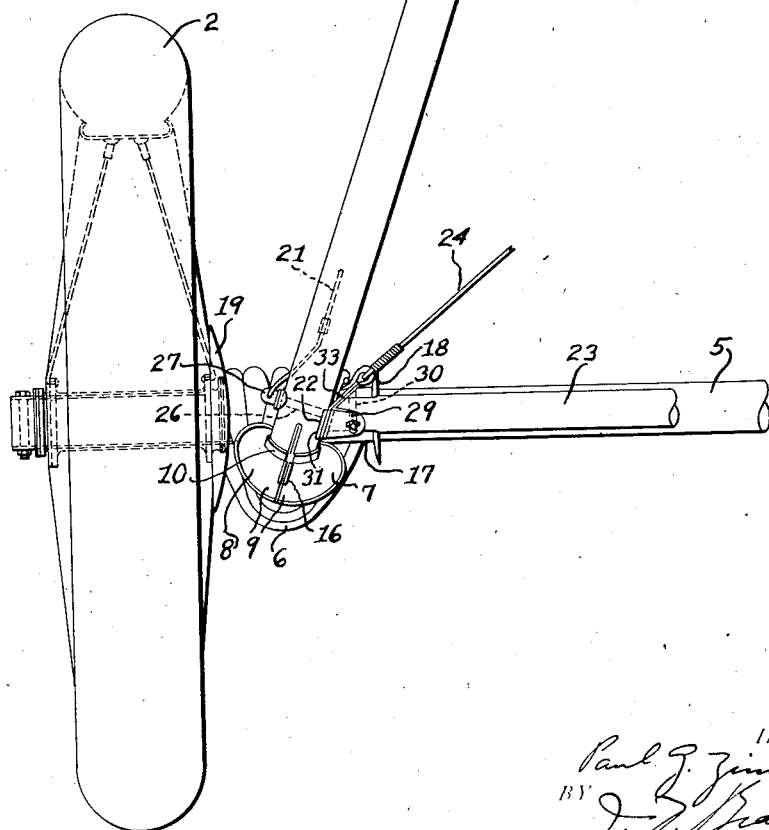
Fig. 1 is a front elevation, showing approximately one-half of the said embodiment of the landing gear.
Figure 2:
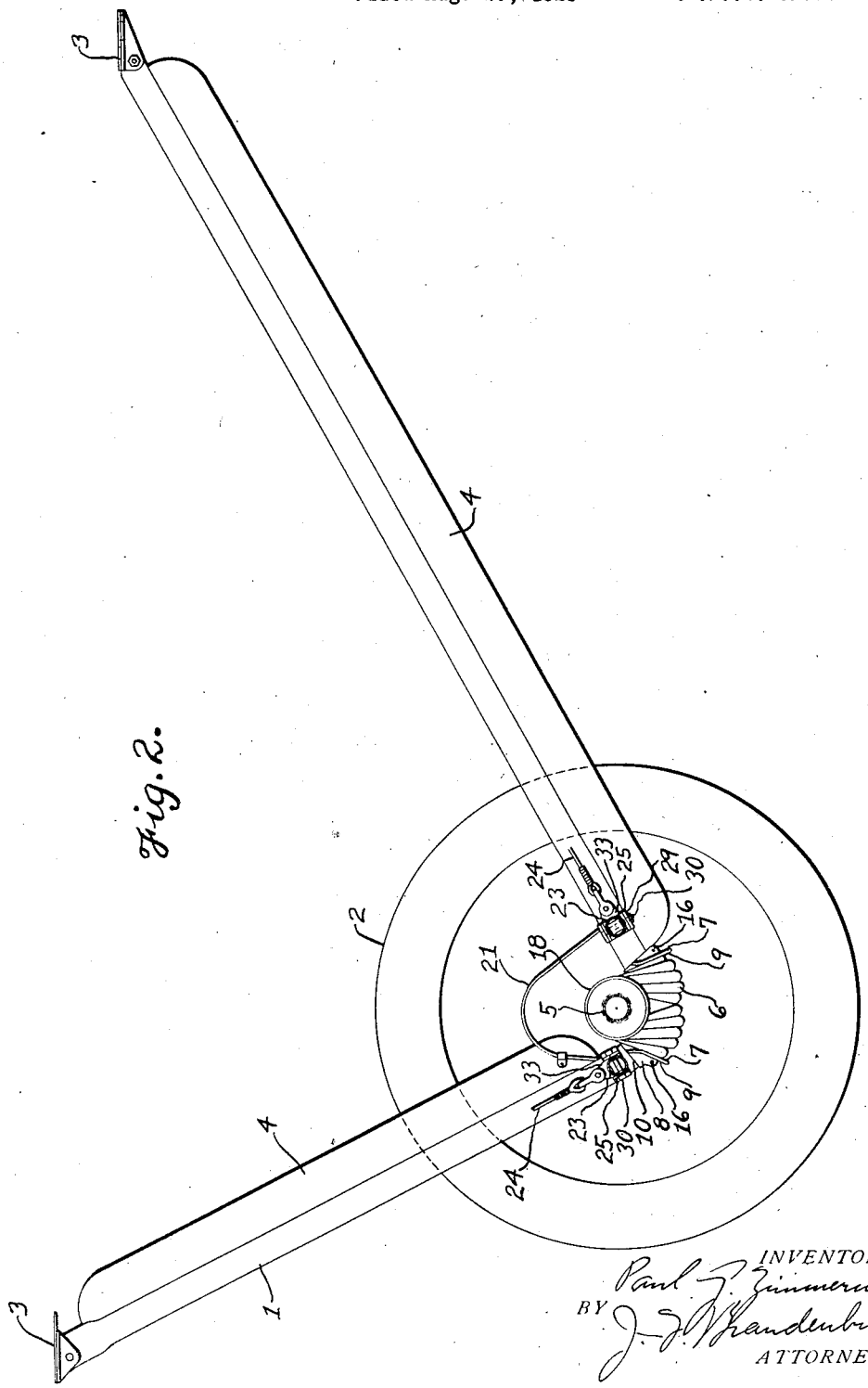
Fig. 2 is an inner side elevation on a smaller scale, resulting from a section taken in a plane transverse to the axle and spacers.
Figure 3:
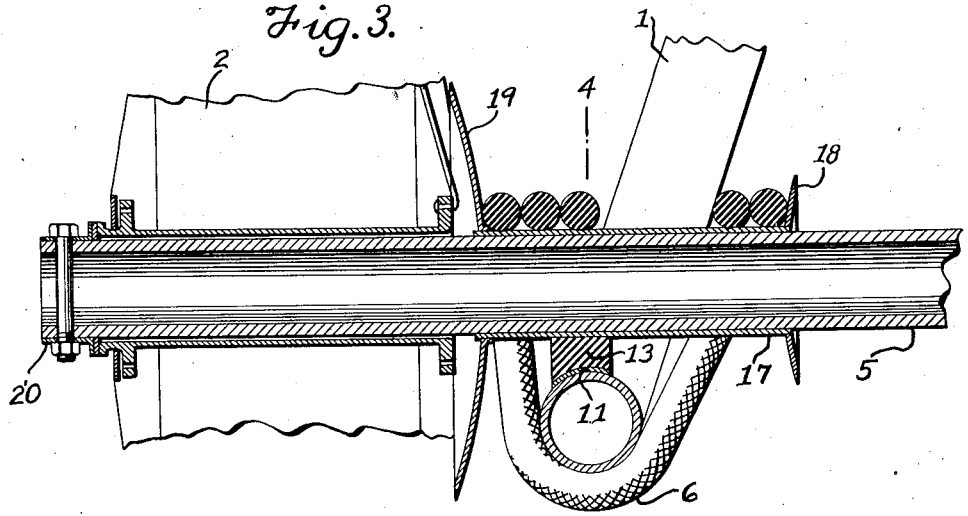
Fig. 3 is an enlarged fragmentary detail taken in the central vertical longitudinal plane of the axle on the line 3—3 of Fig. 4.
Figure 4:
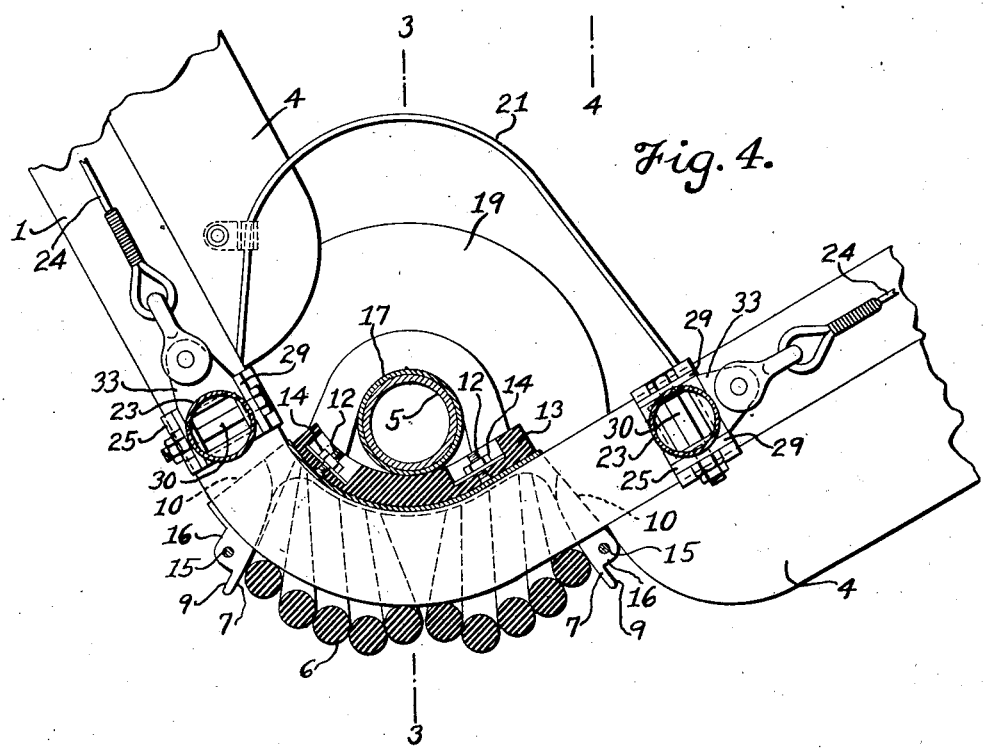
Fig. 4 is a corresponding detail view, taken in a transverse plane through the axle on the line 4—4 of Fig. 3.

The landing gear comprises two V-strut side frames 1 projecting downward from the main framework of the machine, as is usual, only one of these frames and one of the wheels 2 being shown in the drawings, as the opposite side is a duplication. The numeral 3 designates the brackets secured to the main frame, to which the upper ends of the members of the strut frames are pinned.

I construct each of the strut frames 1 of one continuous tube, which is bent into the required form and provided at the rear of the members in a suitable manner with streamlines 4. In the construction and organization of the landing gear I have aimed to limit the number of attachments upon these tubular frames as far as possible and to avoid brazing and welding thereon.

The axle 5 is strapped in the crotches of the strut frames by elastics 6, which are wrapped over the axle and under the bent portions of the frames. The said elastics or rubbers are retained in position upon the frame between the ears 7 of a rubber guard, which is marked generally 8. This rubber guard comprises split end portions 9, each of which includes a split collar 10 to embrace one of the strut members adjacent the crotch, and the two halves of the ears 7 which extend laterally and downwardly from the collar. The two split portions of the fitting are united by a saddle or connecting portion 11 intergral with the tops of the collars and adapted to lie in the crotch of the frame. From this saddle portion two studs 12 project upward to pass through holes in a saddle block 13, upon which the axle rests, the saddle block being secured by the said studs and nuts 14, which engage with the studs in recesses in the top of the block. A rubber guard constructed in this general manner, of suitable material, is adapted to be bent onto the tubular strut frame without other means of attachment than is afforded by bolts 15 passed through perforated lugs 16 on the halves of the terminal portions below the collar.

Upon the axle the rubber or rubbers are confined and protected by a spool 17 having a flange 18 at its inner end and an enlarged dished wheel guard disk 19 at its outer end. This spool floats on the axle, that is to say the spool and axle are capable of relative longitudinal movement, which freedom is advantageous and avoids piercing the axle for a fastening. The wheel 2 is confined between an end retaining collar 20 bolted on the axle and the wheel guard disk 19 on the spool.

The axle, instead of being constrained as to its upward movement in the strut frames, on landing, by guide slots, as is usually the case, is free to move as it will, upward, laterally and endwise, under the restraint and limitation only of the elastics and of a limit wire 21 of suitable length, which extends loosely over the axle, its ends secured to the members of the strut frame at opposite sides of the crotch in a manner which will presently be described. This freedom of the axle results in easier landing and avoids a substantial amount of wear and rigidly applied stress, besides eliminating a fixture upon the strut frame.

The remaining attachments on the strut frame comprise a pair of clips, marked generally 22, which are clamped or bolted to the portions of the frame adjacent and at opposite sides of the crotch. The outer portions of these clips serve as anchorages for the two ends of the limit wire 21, and their inner portions serve both to receive the ends of spacers 23, which extend across between the strut frames in the usual manner, and to afford anchorages for familiar diagonal cross tension wires 24 which run to the main frame of the machine.

The precise form of these clips may be varied. In the preferred construction, each clip comprises a fitting 25 at the inner side of the frame strut and a bolt 26 which passes through the base of the fitting and the tubular strut and is provided at its outer end with an eye or anchor 27 for the limit wire. The fitting 25 for the reception of the cross-spacer preferably comprises a rectangular U-shaped bent-up member, presenting a base 28 pierced by the bolt, and side members 29, which are pierced for a transverse bolt 30 by which the end of the spacer is pinned to the fitting, a flexible socket connection being thus provided. A bent base piece 31 is welded or otherwise united to the back of the body of the fitting, enabling the fitting to seat upon the curved surface of the strut, and the whole is clamped in place by means of the bolt and a nut 32 screwed upon the inner end of the bolt between the side portions 29. The anchorage for the lower end of each tension wire 24 on the clip is afforded in an advantageous manner by a lug 33 bent up from the base 28 of the fitting between and above the side portions 29, the end of the lug presenting an eye, as seen in Fig. 1.

I claim:

1. In a landing gear, and in combination with the axle, a continuous tube bent into a V-strut frame, and a split rubber guard bent around the crotch portion of said frame to receive rubbers wrapped over the axle and under the frame.

2. A rubber guard for application to a V-strut frame of a landing gear, comprising a saddle portion to lie in the crotch of the frame, split collar portions at the ends of the saddle portion to embrace the frame, and guard ear halves extending laterally and downwardly from said collar portions.

3. A rubber guard for application to a V-strut frame of a landing gear, comprising split end portions formed to embrace the members of the frame at opposite sides of the crotch and to present guard ears, and a connecting portion following the crotch.

4. A rubber guard for application to a V-strut frame of a landing gear, comprising a saddle portion to lie in the crotch of the frame, and split end portions formed to embrace the frame and to present guard ears, studs projecting upward from said saddle portion, and a saddle block secured on the saddle portion by said studs.

5. In a landing gear, and in combination with a V-strut frame and an unguided axle elastic-strapped in the crotch, a limit wire extending over the axle, and a clip on said frame presenting at the inner side thereof a fitting for the reception of a cross-spacer and at the outer side of the frame presenting an anchorage for said limit wire.

6. In a landing gear, and in combination with a V-strut frame, an unguided axle elastic-strapped in the crotch of the frame, and a cross-spacer, a fitting at the inner side of the frame for the reception of the end of the cross-spacer, a bolt passing through the frame strut to secure said fitting and having anchoring means at its outer end, and a limit wire extending over the axle secured to said anchoring means.

7. In a landing gear, and in combination with a V-strut frame, an unguided axle elastic-strapped in the crotch of the frame, a cross-spacer, a diagonal cross-tension wire, and a limit wire extending over the unguided axle, a clip on said frame presenting at the inner side thereof a fitting for the reception of the end of the spacer and an anchorage for the diagonal cross-tension wire and at the outer side of the frame presenting an anchorage for the limit wire.

8. In a landing gear, and in combination with a V-strut frame, an unguided axle elastic-strapped in the crotch of the frame, a cross-spacer, a diagonal cross-tension wire, and a limit wire extending over the unguided axle, a fitting at the inner side of the frame strut formed to receive the end of the cross-spacer and also having an anchorage for the diagonal cross-tension wire, and a bolt passing through the frame strut to secure said fitting and having an anchorage at its outer end for the limit wire.

9. In a landing gear, and in combination with a V-strut frame, an axle, and an elastic holding the same in the crotch of the frame, a spool over which the elastic is wrapped floating on the axle, and a wheel-guard disk on the outer end of said spool.

10. In a landing gear, and in combination with a V-strut frame, an axle, an elastic holding the same in the crotch of the frame, and a wheel, a retaining collar fixed on the end of the axle, a spool over which the elastic is wrapped floating on the axle at the inner side of the wheel, and a disk wheel-guard on the outer end of said floating spool, the wheel being confined between said floating spool and its guard on the one hand and the retaining collar on the other hand.

PAUL G. ZIMMERMANN.